United States Patent
Meli et al.

(10) Patent No.: US 12,509,363 B2
(45) Date of Patent: *Dec. 30, 2025

(54) METHOD TO REMOVE CHEMICAL CONTAMINANTS

(71) Applicant: The Procter & Gamble Company, Cincinnati, OH (US)

(72) Inventors: Fabrizio Meli, Montgomery, OH (US); William Michael Scheper, Guilford, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 489 days.

This patent is subject to a terminal disclaimer.

(21) Appl. No.: 17/184,634

(22) Filed: Feb. 25, 2021

(65) Prior Publication Data

US 2021/0269328 A1    Sep. 2, 2021

Related U.S. Application Data

(60) Provisional application No. 62/983,116, filed on Feb. 28, 2020.

(51) Int. Cl.
*C02F 1/00* (2023.01)
*B01D 61/02* (2006.01)
(Continued)

(52) U.S. Cl.
CPC ............ *C02F 1/001* (2013.01); *B01D 61/029* (2022.08); *C02F 1/281* (2013.01); *C02F 1/32* (2013.01);
(Continued)

(58) Field of Classification Search
CPC .. C02F 1/001; C02F 1/281; C02F 1/32; C02F 1/725; C02F 1/78; C02F 2101/34;
(Continued)

(56) References Cited

U.S. PATENT DOCUMENTS 5,389,305 A    2/1995 Repinec
5,458,781 A    10/1995 Lin
(Continued)

FOREIGN PATENT DOCUMENTS

CN    102133505 A    7/2011
CN    105411870 A    3/2016
(Continued)

OTHER PUBLICATIONS

Yangali-Quintanilla, Victor, et al. "Proposing nanofiltration as acceptable barrier for organic contaminants in water reuse." Journal of Membrane Science 362.1-2 (2010): 334-345. (Year: 2010).*
(Continued)

*Primary Examiner* — Magali P Slawski
*Assistant Examiner* — Bernadette Karen McGann
(74) *Attorney, Agent, or Firm* — Andrew J. Mueller

(57) ABSTRACT

A method of removing chemical contaminants from a composition comprising an active, a solvent, and a contaminant can include providing an initial feed supply, wherein the initial feed supply comprises the active, the solvent, and the contaminant, wherein the contaminant can include 1,4 dioxane, dimethyl dioxane, or a combination thereof; including filtering the initial feed stock through a nanofilter.

20 Claims, 1 Drawing Sheet

(51) Int. Cl.
*C02F 1/28* (2023.01)
*C02F 1/32* (2023.01)
*C02F 1/72* (2023.01)
*C02F 1/78* (2023.01)
*C02F 101/34* (2006.01)
*C02F 103/34* (2006.01)

(52) U.S. Cl.
CPC ............... *C02F 1/725* (2013.01); *C02F 1/78* (2013.01); *B01D 2311/2512* (2022.08); *B01D 2311/2634* (2013.01); *B01D 2321/12* (2013.01); *B01D 2325/341* (2022.08); *C02F 2101/34* (2013.01); *C02F 2103/34* (2013.01); *C02F 2301/026* (2013.01); *C02F 2301/06* (2013.01); *C02F 2305/023* (2013.01); *C02F 2305/026* (2013.01)

(58) Field of Classification Search
CPC ............ C02F 2103/34; C02F 2301/026; C02F 2301/06; C02F 2305/023; C02F 2305/026; B01D 61/022; B01D 2311/2634; B01D 2321/12; B01D 2325/34; B01D 2311/06; B01D 2311/14; B01D 2311/18; B01D 2311/25; B01D 61/027
See application file for complete search history.

(56) References Cited

U.S. PATENT DOCUMENTS

| | | | |
|---|---|---|---|
| 5,536,493 | A | 7/1996 | Dubief |
| 5,607,678 | A | 3/1997 | Moore et al. |
| 5,785,859 | A | 7/1998 | Raehse et al. |
| 5,858,169 | A | 1/1999 | Raehse et al. |
| 6,436,383 | B2 | 8/2002 | Murray |
| 7,000,437 | B2 | 2/2006 | Raney et al. |
| 7,918,349 | B2 | 4/2011 | Mickols |
| 7,947,259 | B2 | 5/2011 | Everaert et al. |
| 8,894,859 | B2 | 11/2014 | Livingston |
| 8,933,009 | B2 | 1/2015 | Schacht |
| 9,056,805 | B2 | 6/2015 | Ito et al. |
| 9,315,404 | B2 | 4/2016 | Smit |
| 2002/0081274 | A1 | 6/2002 | Fan |
| 2003/0133899 | A1 | 7/2003 | Fan |
| 2006/0024381 | A1 | 2/2006 | Schwartz et al. |
| 2006/0269501 | A1 | 11/2006 | Johnson et al. |
| 2007/0009463 | A1 | 1/2007 | Niebauer et al. |
| 2007/0207109 | A1* | 9/2007 | Peffly .................. A61K 8/891 424/70.13 |
| 2009/0032465 | A1 | 2/2009 | Baumgarten et al. |
| 2009/0155383 | A1 | 6/2009 | Kitko et al. |
| 2010/0041925 | A1 | 2/2010 | Reimann et al. |
| 2010/0163471 | A1 | 7/2010 | Elyanow et al. |
| 2011/0028759 | A1 | 2/2011 | Lum et al. |
| 2011/0091393 | A1 | 4/2011 | Simmonds et al. |
| 2011/0182843 | A1 | 7/2011 | Derks |
| 2011/0319306 | A1 | 12/2011 | Walters et al. |
| 2012/0160753 | A1* | 6/2012 | Vora .......................... C02F 9/00 210/252 |
| 2013/0168315 | A1 | 7/2013 | Minier et al. |
| 2015/0210661 | A1 | 7/2015 | Boussie et al. |
| 2015/0329927 | A1* | 11/2015 | Parekh .................. C13K 13/002 127/55 |
| 2015/0344856 | A1 | 12/2015 | Jourdier et al. |
| 2016/0045418 | A1 | 2/2016 | Schroeder et al. |
| 2016/0053159 | A1* | 2/2016 | Ploegmakers ......... C09K 8/035 536/117 |
| 2016/0081900 | A1 | 3/2016 | Cao et al. |
| 2017/0015642 | A1 | 1/2017 | Sokolovskil et al. |
| 2018/0030555 | A1 | 2/2018 | Van Tuel et al. |
| 2018/0297867 | A1 | 10/2018 | Fleckner et al. |
| 2019/0270660 | A1 | 9/2019 | Schmidt |
| 2021/0346265 | A1 | 11/2021 | Johnson et al. |
| 2023/0109082 | A1 | 4/2023 | Hedin et al. |
| 2024/0166534 | A1 | 5/2024 | Hedin |

FOREIGN PATENT DOCUMENTS

| | | |
|---|---|---|
| DE | 19630089 C1 | 10/1997 |
| DE | 19709085 A1 | 11/1997 |
| EP | 0569028 A2 | 11/1993 |
| EP | 0633309 A1 | 1/1995 |
| EP | 2402000 A1 | 1/2012 |
| JP | H01139130 A | 5/1989 |
| JP | H0910566 A | 1/1997 |
| JP | 2000155426 A | 6/2000 |
| JP | 2003001254 A | 1/2003 |
| JP | 2003260337 A | 9/2003 |
| JP | 2010046562 A | 3/2010 |
| JP | 2011115151 A | 6/2011 |
| JP | 2012017325 A | 1/2012 |
| JP | 2015150553 A | 8/2015 |
| JP | 2016059876 A | 4/2016 |
| WO | 9420187 A1 | 9/1994 |
| WO | 0236095 A2 | 5/2002 |
| WO | WO-2016131828 A1 * | 8/2016 ............ B01D 61/027 |
| WO | 2018002557 A1 | 1/2018 |

OTHER PUBLICATIONS

All Office Actions; U.S. Appl. No. 17/184,636.
U.S. Appl. No. 17/184,636, filed Feb. 25, 2021, to Justin Thomas Lydon Hedin et al.
15730M PCT Search Report and Written Opinion for PCT/US2021/019500 dated Jun. 10, 2021.
Yangali Quintanilla Vet al, "Proposing nanofiltration as acceptable barrier for organic contaminants in water reuse" Journal of Membrane Science, Elsevier BV, NL,vol. 362, No. 1-2, Oct. 15, 2010 (Oct. 15, 2010), pp. 334-345.
ITTC—Recommended Procedures Fresh Water and Seawater Properties, 2011, pp. 1-45.
All Office Actions; U.S. Appl. No. 18/429,699, filed on Feb. 1, 2024.
Non-Final Office Action; U.S. Appl. No. 18/071,764, dated Mar. 23, 2023; 13 pages.
Notice of Allowance; U.S. Appl. No. 18/071,764, dated Aug. 16, 2023; 05 pages.
Notice of Allowance; U.S. Appl. No. 18/071,764, dated Jan. 25, 2024; 05 pages.
Notice of Allowance; U.S. Appl. No. 18/071,764, dated Oct. 18, 2023; 05 pages.

* cited by examiner

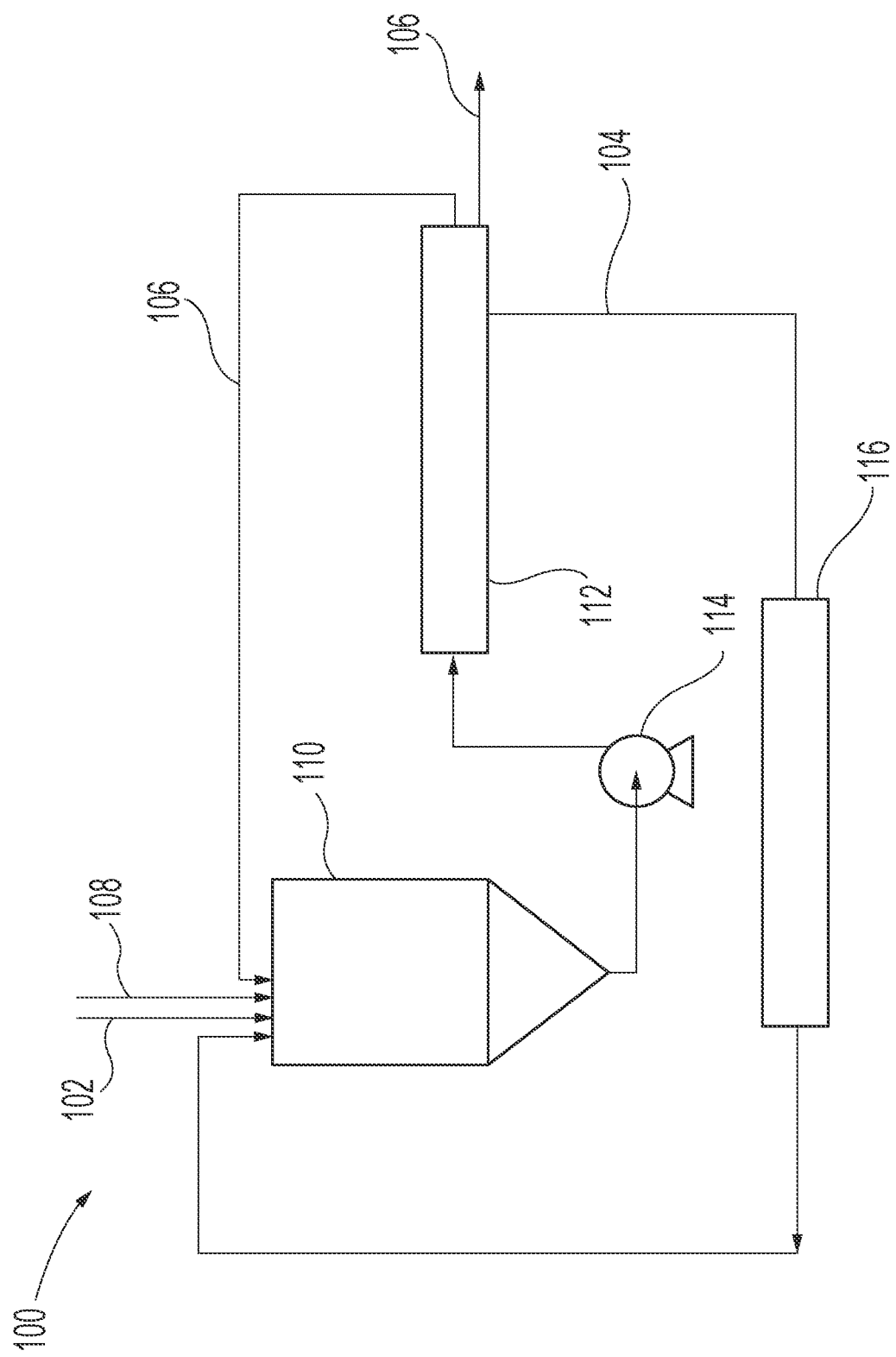

METHOD TO REMOVE CHEMICAL CONTAMINANTS

The application relates generally to processes and apparatus for removing contaminants, like dioxane components from materials such as solutions, dispersions, slurries, emulsions, and pastes. More particularly, the application relates to processes that can remove 1,4-dioxane from alkoxylated fatty alcohol sulfate pastes to a level previously not possible without the use of steam.

BACKGROUND OF THE INVENTION

Chemical contaminants are sometimes found in raw materials or products utilizing raw materials. For example, 1,4-dioxane is an undesirable byproduct of detergent making. As an industrial processing solvent or chemical intermediate, 1,4-dioxane has previously been reported to be used in the production of products that may have commercial or consumer applications such as paints, adhesives, detergents, and pesticides. As such 1,4-dioxane may be present as a contaminant in consumer cosmetics/toiletries, household detergents, pharmaceuticals, foods, agricultural and veterinary products and ethylene glycol-based antifreeze coolants. It is formed as a reaction byproduct during the manufacturing of ethoxylated surfactants. Manufacturers can remove most of the 1,4-dioxane in consumer products through a vacuum stripping process. However, this process is costly and requires steam which can be capital intensive. As such, there exists a need to create a new method of removing contaminants, like 1,4-dioxane from already ethoxylated surfactants.

SUMMARY OF THE INVENTION

Included herein, for example, is a method of removing chemical contaminants from a composition comprising an active, a solvent, and a chemical contaminant, the method comprising providing an initial feed supply, wherein the initial feed supply comprises the active, the solvent, and the chemical contaminant; providing a nanofilter; and filtering the initial feed supply through the nanofilter to form an initial retentate and an initial filtrate; wherein the initial retentate has a lower ratio of the chemical contaminant to the active than the initial feed supply.

A method of removing chemical contaminants from a composition comprising an active, a solvent, and a chemical contaminant, the method comprising: providing an initial feed supply, wherein the initial feed supply comprises the active comprising an ethoxylated surfactant, a sulfated ethoxylated surfactant, an ethoxylated polymer, or a combination thereof: the solvent and the contaminant comprising 1,4 dioxane, dimethyl dioxane, or a combination thereof; providing a nanofilter; filtering the initial feed supply through the nanofilter to form an initial retentate and a filtrate; wherein the initial retentate has a lower ratio of the contaminant to the active than the initial feed supply; repeating the steps of filtering and adding a solvent until the process yields a concentrated retentate including 18 wt. % to 99 wt. % active. These and other potential incarnations will be described more fully below.

BRIEF DESCRIPTION OF THE DRAWINGS

FIG. 1 is a process schematic of a method of removing a contaminant.

The drawing is illustrative in nature and not intended to be limiting of the invention.

DETAILED DESCRIPTION OF THE INVENTION

Features and benefits of the present invention will become apparent from the following description, which includes examples intended to give a broad representation of the invention. Various modifications will be apparent to those skilled in the art from this description and from practice of the invention. The scope is not intended to be limited to the particular forms disclosed and the invention covers all modifications, equivalents, and alternatives falling within the spirit and scope of the invention as defined by the claims.

As used herein, the articles including "the," "a" and "an" when used in a claim or in the specification, are understood to mean one or more of what is claimed or described.

As used herein, the terms "include," "includes" and "including" are meant to be non-limiting.

The term "substantially free of" or "substantially free from" as used herein refers to either the complete absence of an ingredient or a minimal amount thereof merely as impurity or unintended byproduct of another ingredient. A composition that is "substantially free" of/from a component means that the composition comprises less than about 0.5%, 0.25%, 0.1%, 0.05%, or 0.01%, or even 0%, by weight of the composition, of the component.

As used herein the phrases "detergent composition" and "cleaning composition" are used interchangeably and include compositions and formulations designed for cleaning soiled material. Such compositions include but are not limited to, laundry cleaning compositions and detergents, shampoo, body wash, hand cleanser, facial cleanser, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As mentioned above, compositions can contain contaminants which are not preferred by the manufacturer and/or user. These contaminants can be chemical in nature, like an unwanted by-product, reaction product, etc. or physical in nature, like a particle, dust, dirt, etc. Removing contaminants from a composition can be costly and can make a product fiscally unviable. One chemical contaminant in which there is an interest in removing from products is 1,4-dioxane.

Previous attempts to remove 1,4-dioxane from a surfactant paste utilizing a process called vacuum stripping. In this system, steam is used under vacuum to separate 1,4-dioxane from the surfactant paste. This process is burdensome as it requires careful control of conditions like temperature and pressure to have a successful outcome and requires a lot of energy as it requires an influx of steam throughout the process. Thus, there is room for improvement in methods of removing chemical contaminants, like 1,4-dioxane.

Present inventors have discovered that chemical contaminants, like dioxane, can be removed through a nanofiltration process. The nanofiltration process utilizes weight average molecular weight to filter the unwanted chemical contaminant from the product. The process allows for a wide variety of processing conditions which can be adjusted based on the targeted chemical contaminant and the product in which it is contained. These will be discussed in more detail below.

From a composition standpoint, this process can include an initial feed composition. The initial feed composition likely includes an active, a solvent, a contaminant, and/or one or more minor materials. The initial feed composition is discussed in more detail below.

Initial Feed Composition

The initial feed composition comprises one or more solvents, a desired active, and one or more chemical contaminants. The solvent may come in with the desired active, be separately added, or both. The initial feed composition may also comprise one or more minor materials. The initial feed may also comprise a surfactant composition which comprises surfactant and water. As stated above, it has been surprisingly found that through the method described below incorporating nanofiltration, one can reduce the level of contaminants from an initial feed composition in comparison to the level of active in the composition. Without being bound by theory, it is believed that by selectively choosing the right solvents for a specific contaminant and the right filtration membrane, one can create a process wherein the solvent and the contaminant can be at least partially removed to form a filtrate while maintaining the substantial majority of the active to create a retentate. One can then either, recirculate the remaining retentate thereby increasing the percentage of active in the retentate and/or run the retentate through additional filtration columns. Further, one may add additional contaminant free solvent to the retentate thereby increasing ratio of solvent to active while reducing the ratio of contaminant to solvent in the retentate. The retentate with contaminant free solvent may then be filtered additionally. This process may recirculate until a desired ratio of solvent to active and a desired ratio of contaminant to solvent or to active is reached. One of ordinary skill in the art would understand that while the focus is on solvent, active, and contaminant, the composition may comprise more than one active, more than one contaminant, and other minors. As such, what is described above and below serves as an example utilizing a solvent in relation to an active and a contaminant as an illustrative example.

Solvents

Solvents may comprise water, organic solvents such as, for example, ethanol, propane diol, glycerin ethoxylate, glycerin propoxylate, $C_1$-$C_4$ alkanolamine, glycerol, or combinations thereof. $C_1$-$C_4$ alkanolamines can include, for example, monoethanolamine, triethanolamine, or a combination thereof. The solvent may have a weight average molecular weight about the same as or less than the target chemical contaminant. For example, the solvent may have a weight average molecular weight of about 400 Da or less, about 300 Da or less, about 250 Da or less, about 200 Da or less, about 150 Da or less, about 100 Da or less, about 50 Da or less, about 25 Da or less, or about 10 Da or less.

Minor Materials

The initial feed composition may also comprise one or more minor materials. Minor materials may comprise, for example, salts, biocides, and/or buffers. Nonlimiting examples include sodium sulfates and sodium hydroxide.

Contaminant

The contaminant may be any chemical compound that is deemed undesirable in a final formulation. For example, the contaminant may be 1,4 dioxane, dimethyl dioxane, or a combination thereof. The contaminant may have a weight average molecular weight about the less than the target active. For example, the solvent may have a weight average molecular weight of about 400 Da or less, about 300 Da or less, about 250 Da or less, about 200 Da or less, about 150 Da or less, about 100 Da or less, about 50 Da or less, about 25 Da or less, or about 10 Da or less.

Active

The active may be any chemical composition that has commercial value which has a chemical contaminant. The active may be, for example, an ethoxylated surfactant, a sulfated ethoxylated surfactant, an ethoxylated polymer, a propoxylated surfactant, a sulfated propoxylated surfactant, a propoxylated polymer, or a combination thereof. The active may be an alkoxylated polyamine compounds. The active may be a zwitterionic poly amine. The active may, for example, have a weight average molecular weight of about 250 Da to about 10001 Da, about 300 Da to about 750 Da, about 300 Da to about 500 Da, or about 300 Da to about 400 Da. The active may be present at a level of about 5% to about 50%, from about 10% to about 40%, from about 15% to about 25%, by weight of the initial feed.

Ethoxylated Surfactant

The active may be an ethoxylated surfactants or a sulfated ethoxylated surfactant. Detergent compositions can contain surface active ingredients (sometimes referred to as "detergent active ingredients" or "detergent actives"), which may be neutralized salts of acids produced, for example, by sulfating or sulfonating $C_8$-$C_{20}$ organic materials and, preferably, $C_{10}$-$C_{18}$ organic materials, such as, for example, fatty alcohols, alkoxylated fatty alcohols, ethoxylated fatty alcohols, alkyl benzenes, alpha olefins, methyl esters, alkyl phenol alkoxylates, and alkyl phenol ethoxylates. The process of making detergent actives from the acid form is typically performed in a solvent, such as water and/or alcohol. The resulting detergent material may be a paste, a solution, or a slurry of various components. (The term detergent "paste" as used hereinafter is meant to include detergent solutions, slurries and pastes). Final detergent compositions are made from such detergent pastes.

Fatty alcohol ethoxy sulfates (AES) is a mild surfactant that generates considerable foam and has excellent degreasing properties. It is used in personal care products, such as shampoo and body wash, and liquid dish cleaners, for example. Since it is derived from fatty alcohol it can be made from natural oils, for example coconut oil. It can also be made from synthetic alcohol. 1,4-dioxane is a by-product formed largely during the sulfation process of making fatty alcohol alkoxy sulfates (AES) in relatively small amounts. The 1,4-dioxane remains in the sulfated AES paste and other subsequent compositions that contain it. Dioxane has come under increasing scrutiny by consumer groups and regulatory bodies. There is thus a need for minimizing 1,4-dioxane in sulfated products.

Technology for minimizing 1,4-dioxane formation has been reported in the literature dating back decades. Prior studies report steps that can be taken in the sulfation process to minimize the amount of 1,4-dioxane that forms. Reducing the $SO_3$ gas concentration from 4% to 2.5%, for example, has a dramatic effect and cuts the amount of 1,4-dioxane that forms in half. Less dramatic benefits come from running at low mole ratios of $SO_3$: feed so that conversion of the feed to the sulfated product is less complete. These changes have a dramatic impact on the production capacity and cost-efficiency of a sulfation plant. Moves such as these cut the plant capacity by as much as 50%.

Alkoxylated fatty alcohols are not "pure" materials but are mixtures of homologous molecules that contain different amounts of ethylene oxide, for example. The addition of ethylene oxide into fatty alcohols has long been done to produce nonionic surfactants. These have many uses in consumer products. A typical nonionic ethoxylated fatty alcohol (AE) can be referred to as a nominal "3-mole AE", meaning that it has on average 3 moles of ethylene oxide reacted with each mole of alcohol. In fact, the product will contain some of the primary alcohol with no EO added, some 1-EO, some 2-EO, some 3-EO, some 4-EO and so forth up the homologous series. Thus, most manufacturers name their AE by describing the fatty alcohol and the average number of EO added. The amount of 1,4-dioxane that forms upon sulfation with air-$SO_3$ gas increases with the EO content of the AE feed. To minimize the formation of 1,4-dioxane some manufacturers have decided to shift the average EO content to a numberless than 2 in an attempt to reduce the amount of 1,4-dioxane that forms. This choice may result in a reduction of 1,4-dioxane, but trading of the optimum EO content in the AES for product performance.

[0045] The present inventors recognized that modifying the sulfation process to try to reduce the amount of 1,4-dioxane would not efficiently provide the means to eliminate 1,4-dioxane or to reduce it to an insignificant concentration; instead, the present inventors created a process and embodiments of suitable apparatus to physically and selectively remove 1,4-dioxane from the AES following sulfation, and prior to final product formulation when a dilute product is desired.

In the following description, the primary dioxane component referred to is 1,4-dioxane, although other dioxane isomers are also contemplated. Thus, the dioxane component can include one or more of 1,2-dioxane, 1,3-dioxane, and 1,4-dioxane.

As mentioned above, the undesirable byproduct, 1,4-dioxane, is made during the sulfation process. A proposed mechanism for the formation of 1,4-dioxane is for a molecule of ethoxysulfuric acid to form a complex with a molecule of $SO_3$. A rearrangement occurs, forming a new ethoxysulfuric acid with two fewer ethylene oxide equivalent units and 1,4-dioxane which is complexed with an $SO_3$. The $SO_3$ can be released from the 1,4-dioxane and react to form ethoxysulfuric acid or recycle through this process and generate another molecule of 1,4-dioxane.

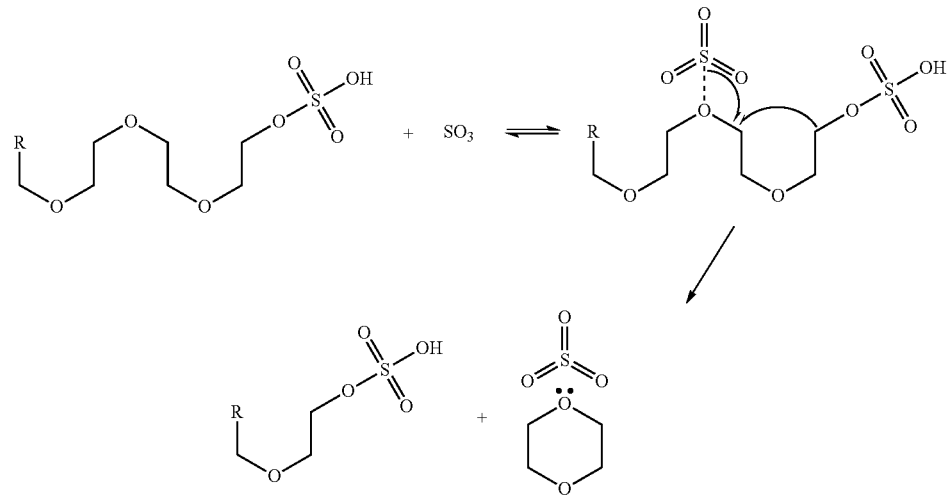

In a process described herein, the feedstock paste optionally can be an ethoxylated fatty alcohol sulfate paste.

A common feedstock material that can be used in the method described herein is sodium ethoxysulfate (AES) with 0.8 to 3 moles of ethoxylation with ethylene oxide (EO) per mole of fatty alcohol. The fatty alcohol carbon chain length is typically in the range of $C_{12}$ to $C_{16}$ and can be the made from a naturally occurring material or can be purely synthetic or any combination thereof. The degree of ethoxylation with ethylene oxide can be in the range of 0.5 to 50 moles of EO to mole of fatty alcohol, for example in a range of 1 to 12, or 3 to 7, for the purposes of sulfation to ethoxysulfuric acid and subsequent neutralization of the acid. Neutralization can be with sodium, potassium and ammonium types (e.g., TEA) on anionic bases, for example. The molecular weight for example of a sodium ethoxysulfate (3 moles of EO) will be in the range of 442 Daltons. The process described herein for removing dioxane is not constrained by the source of the carbon chain, the degree of ethoxylation, or the neutralizing agent.

In a process described herein, the process optionally can be performed to yield a composition having a ratio of contaminant, to active of between 0:100 and 15:85, such as for example 1:99, 2:98, 3:97, 4:96, 5; 95, 6:94, 7:93, 8:92, 9:91, 10:90, 11:89, 12:88, 13:87, or 14:86. In one example, this ratio is of dioxane to sulfated ethoxy surfactant.

In a process described herein, the process optionally can be performed until the total % of contaminant, like dioxane, in the composition is less than 10%, such as, for example, 9%, 8%, 7%, 6%, 5%, 4%, 3%, 2%, or less than 1% such as, between 0.0001% and 1% of the total composition.

In a process described herein, the process optionally can be performed to yield a concentrated product having a water content of 25 wt. % or less, or 15 wt. % or less, or 5 wt. % or less, or 2 wt. % or less.

In a process described herein, the process optionally can be performed to remove a dioxane component which is 1,4-dioxane.

Alkoxylated Polyamine Compounds

The active may be an alkoxylated polyamine compounds. Alkoxylated polyamine compounds are known to deliver cleaning and/or whitening benefits, for example soil anti-redeposition benefits. However, it has surprisingly been discovered that alkoxylated polyamine compounds can operate synergistically with sulfated surfactants at acidic pHs to provide surfactant stability benefits in addition to cleaning and/or whitening benefits. It is believed that the polyamines inhibit the rate of sulfated surfactant hydrolysis in low pH systems by interrupting H$^+$ access to the interface and/or by interrupting interaction among the sulfated surfactants.

In some aspects, the compositions of the present disclosure comprise from about 0.01%, or from about 0.05%, or from about 0.1%, or from about 0.5%, or from about 0.8%, or from about 1.0%, or from about 1.5%, to about 2%, or to about 2.5%, or to about 3%, or to about 5%, or to about 10%, or to about 15%, or to about 20%, by weight of the composition of alkoxylated polyamines. The composition may comprise mixtures of alkoxylated polyamines.

The alkoxylated polyamine compound may have a weight average molecular weight of from about 200 to about 60,000, or to about 20,000, or to about 10,000 Daltons. In some aspects, the weight average molecular weight is from about 350 to about 5000, or to about 2000, or to about 1000 Daltons. In some aspects, the alkoxylated polyamine comprises a polyethyleneimine (PEI) backbone, where the backbone has a weight average molecular weight of from about 200 to about 1500, or of about 400 to about 1000, or of about 500 to about 800, or of about 600 Daltons.

The polyamines of the present disclosure are suitable for use in liquid laundry detergent compositions, inter alia, gels, thixotropic liquids, and pourable liquids (i.e., dispersions, isotropic solutions).

In some aspects, the alkoxylated polyamine compound comprises one or more alkoxylated compounds having at least two alkoxylated amine, imine, amide or imide groups. Preferred are compounds having at least two alkoxylated amine groups, where the alkoxylated amine groups comprise alkoxylation groups.

The alkoxylation groups may have one or more alkoxylates, typically more than one, thus forming a chain of alkoxylates, or polyalkoxylation group. The compound may have two alkoxylation groups or chains, preferably at least 4 or even at least 7 or even at least 10 or even at least 16. Preferred is that the alkoxylation groups are polyalkoxylation groups, each independently having an average alkoxylation degree of at least about 5, more preferably at least about 8, preferably at least about 12, up to preferably about 80 or even to about 50 or even to about 25. The (poly) alkoxylation is preferably a (poly)ethoxylation and/or (poly) propoxylation. Thus, preferred is that the alkoxylation group comprises a polyethoxylation group, a polypropoxylation group, a polyethoxylation/polypropoxylation group, or mixture thereof.

The alkoxylated polyamine compound is preferably a polyamide, polyimide or more preferably a polyamine or polyimine compound, whereby these amide, imide, amine or imine units are present as backbone of the polymer, forming the chain of repeating units. Preferably, these polymers have at least 3 or even 4 or even 5 amide, imide, amine or imine units. It may be preferred that only some of the amine or imine are alkoxylated. It may be preferred that the backbone has also side-chains containing amide, imide, amine or imine groups, which may be alkoxylated.

In some aspects, the polyamine comprises a polyalkylamine backbone. The polyalkylamine may comprise C2 alkyl groups, C3 alkyl groups, or mixtures thereof. In some aspects, the polyamine has a polyethyleneimine (PEI) backbone. Preferred PEI backbones of the polyamines described herein, prior to alkoxylation, have the general formula:

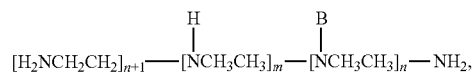

where n+m is equal to or greater than 10, or 12, or 14, or 18, or 22, and where B represents a continuation of this structure by branching.

Preferred polyamines include substantially noncharged, low molecular weight, water soluble, and lightly alkoxylated ethoxylated/propoxylated polyalkyleneamine polymers, such as those described in U.S. Pat. No. 5,565,145, incorporated herein by reference. By "lightly" is meant the polymers of this invention average from about 0.5 to about 10 alkoxylations per nitrogen. By "substantially noncharged" is meant that there is no more than about 2 positive charges for every 40 nitrogens present in the backbone of the polyalkyleneamine polymer.

Particularly preferred polyamines include ethoxylated/propoxylated polyalkylamine polymers that are ethoxylated $C_2$-$C_3$ poly alkyleneamines, ethoxylated $C_2$-$C_3$ poly alkyleneimines, and mixtures thereof, for example ethoxylated polyethyleneamines (PEAs) and ethoxylated polyethyleneimines (PEIs). In the polyalkyleneimines and polyalkyleneamines, each hydrogen atom attached to each nitrogen atom represents an active site for subsequent ethoxylation. The PEIs used in preparing some preferred compounds can have a molecular weight of at least about 600 prior to ethoxylation, which represents at least about 14 units. Preferred are ethoxylated polyethyleneimines, preferably having an average ethoxylation degree per ethoxylation chain of from about 15 to about 25, and a molecular weight of from about 1000 to about 2000 Daltons. A preferred polyamine is PEI 600 E20. Also preferred are ethoxylated tetraethylene pentaimines. In some aspects, the molecular average molecular weight of the ethoxylated polyethyleneamines and/or the ethoxylated polyethyleneimines are from about 8000 to about 25,000, or from about 10,000 to about 20,000, or from about 12,000 to about 15,000, or about 14,000 g/mol.

Highly preferred alkoxylated polyamine compounds are ethoxylated polyamine compounds of the following structures:

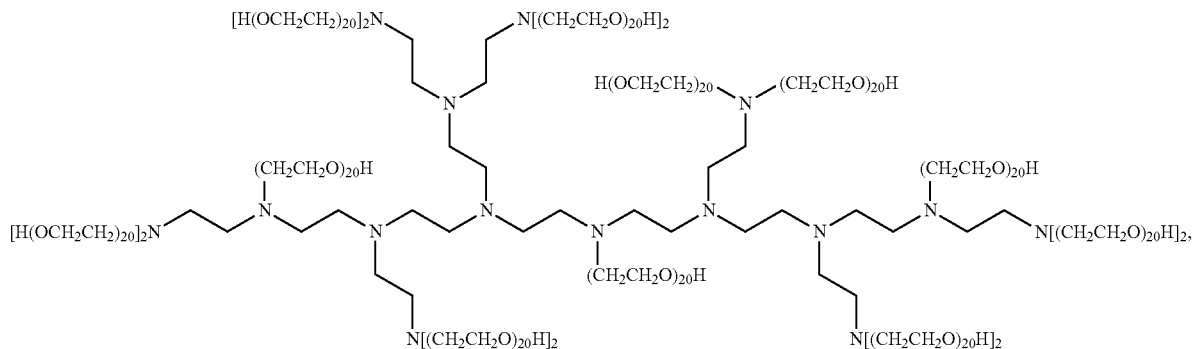

and/or

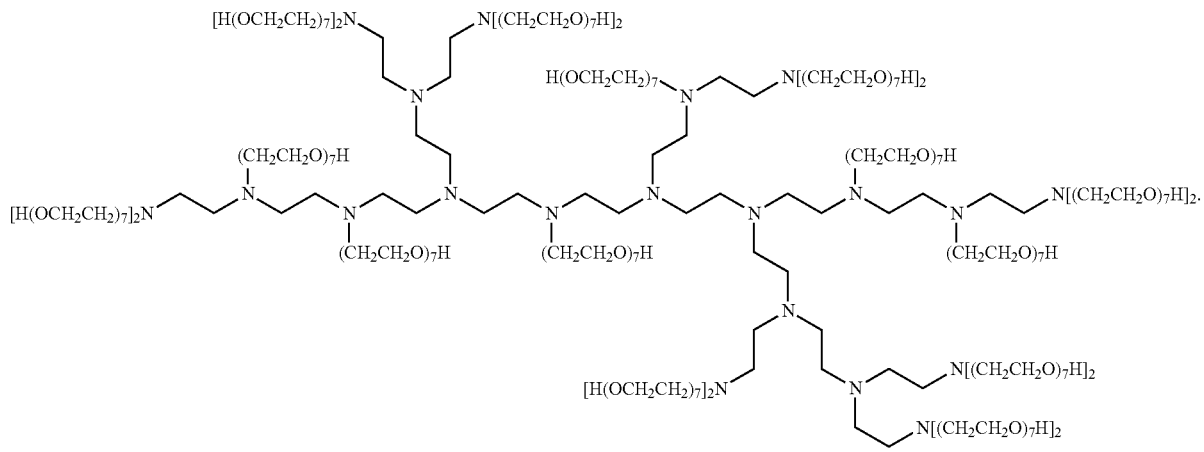

Also highly preferred are ethoxylated tetraethylene pentaamine.

Zwitterionic Polyamine

The active may be a zwitterionic polyamine. Preferably, the zwitterionic polyamine is selected from zwitterionic polyamines having the following formula:

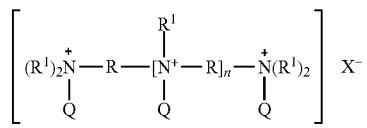

R is C3-C20 preferably C5-C10 more preferably C6-C8 linear or branched alkylene, and mixtures thereof, most preferably linear C6.

$R^1$ is an anionic or partially anionic unit-capped polyalkyleneoxy unit having the formula: —(R2O)xR3, wherein R2 is C2-C4 linear or branched alkylene, and mixtures thereof, preferably C2 or branched C3 and mixtures thereof, more preferably C2 (ethylene); R3 is hydrogen, an anionic unit, and mixtures thereof, in which not all R3 groups are hydrogen; x is from about 5 to about 50, preferably from about 10 to about 40, even more preferably from about 15 to about 30, most preferably from about 20 to about 25. A preferred value for x is 24, especially when $R^1$ comprises entirely ethyleneoxy units. Depending upon the method by which the formulator chooses to form the alkyleneoxy units, the wider or narrower the range of alkyleneoxy units present. The formulator will recognize that when ethoxylating a zwitterionic polyamine, only an average number or statistical distribution of alkyleneoxy units will be known. x values highlighted represent average values per polyalkoxy chain. Preferably the range of alkyleneoxy units within the zwitterionic polyamine is plus or minus two units, more preferably plus or minus one unit. Most preferably each $R^1$ group comprises about the same average number of alkyleneoxy units. Non-limiting examples of R3 anionic units include —(CH2)pCO2M; —(CH2)qSO3M; —(CH2)qOSO3M; —(CH2)qCH(SO2M)-CH2SO3M; —(CH2)qCH(OSO2M)CH2OSO3M; —(CH2)qCH(SO3M)CH2SO3M; —(CH2)pPO3M; —PO3M; —SO3M and mixtures thereof; wherein M is hydrogen or a water soluble cation in sufficient amount to satisfy charge balance. Preferred anionic units are —(CH2)pCO2M; —SO3M, more preferably —SO3M (sulfonate group). The indices p and q are integers from 0 to 6, preferably 0 to 2, most preferably 0. For the purposes of the present invention, all M units, can either be a hydrogen atom or a cation depending upon the form isolated by the artisan or the relative pH of the system wherein the compound is used. Non-limiting examples of preferred cations include sodium, potassium, ammonium, and mixtures thereof.

Q is a quaternizing unit selected from the group consisting of C1-C30 linear or branched alkyl, C6-C30 cycloalkyl, C7-C30 substituted or unsubstituted alkylenearyl, and mixtures thereof, preferably C1-C30 linear or branched alkyl, even more preferably C1-C10 or even C1-C5 linear or branched alkyl, most preferably methyl; the degree of quaternization preferably is more than 50%, more preferably more than 70%, even more preferably more than 90%, most preferably about 100%.

X is an anion present in sufficient amount to provide electronic neutrality, preferably a water soluble anion selected from the group consisting of chlorine, bromine, iodine, methylsulfate, and mixtures thereof, more preferably chloride. To a great degree, the counter ion X will be derived from the unit which is used to perform the quaternization. For example, if methyl chloride is used as the quaternizing agent, chlorine (chloride ion) will be the counter ion X. Bromine (bromide ion) will be the dominant counter ion in the case where benzyl bromide is the quaternizing reagent.

n is from 0 to 4, preferably 0 to 2, most preferably 0.

Preferably from about 10% to about 100%, more preferably from about 20% to about 70%, even more preferably from 30% to about 50%, most preferably from about 35% to about 45% of the R3 groups are an anionic unit, preferably a sulfonate unit, the remaining R3 units being hydrogen.

Particularly preferred zwitterionic polyamines are zwitterionic hexamethylene diamines according to the following formula:

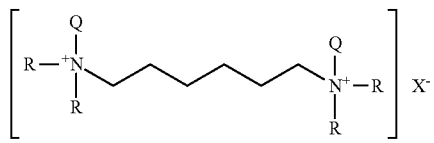

R is an anionic or partially anionic unit-capped polyalkyleneoxy unit having the formula: —(R2O)$_x$R3 wherein R2 is C2-C4 linear or branched alkylene, and mixtures thereof, preferably C2 or branched C3 and mixtures thereof, even more preferably C2 (ethylene); R3 is hydrogen, an anionic unit, and mixtures thereof, in which not all R3 groups are hydrogen; x is from about 5 to about 50, preferably from about 10 to about 40, even more preferably from about 15 to about 30, most preferably from about 20 to about 25. A preferred value for x is 24, especially when R comprises entirely ethyleneoxy units. Depending upon the method by which the formulator chooses to form the alkyleneoxy units, the wider or narrower the range of alkyleneoxy units present. The formulator will recognize that when ethoxylating a zwitterionic polyamine, only an average number or statistical distribution of alkyleneoxy units will be known. x values highlighted represent average values per polyalkoxy chain. Preferably the range of alkyleneoxy units within the zwitterionic polyamine is plus or minus two units, more preferably plus or minus one unit Most preferably each R group comprises about the same average number of alkyleneoxy units. Non-limiting examples of R3 anionic units include —(CH2)pCO2M; —(CH2)qSO3M; —(CH2)qOSO3M; —(CH2)qCH(SO2M)-CH2SO3M; —(CH2)qCH(OSO2M)CH2OSO3M; —(CH2)qCH(SO3M)CH2SO3M; —(CH2)pPO3M; —PO3M; —SO3M and mixtures thereof; wherein M is hydrogen or a water soluble cation in sufficient amount to satisfy charge balance. Preferred anionic units are —(CH2)pCO2M; —SO3M, more preferably —SO3M (sulfonate group). The indices p and q are integers from 0 to 6, preferably 0 to 2, most preferably 0. For the purposes of the present invention, all M units, can either be a hydrogen atom or a cation depending upon the form isolated by the artisan or the relative pH of the system wherein the compound is used. Non-limiting examples of preferred cations include sodium, potassium, ammonium, and mixtures thereof.

Q is a quaternizing unit selected from the group consisting of C1-C30 linear or branched alkyl, C6-C30 cycloalkyl, C7-C30 substituted or unsubstituted alkylenearyl, and mixtures thereof, preferably C1-C30 linear or branched alkyl, even more preferably C1-C10 or even C1-C5 linear or branched alkyl, most preferably methyl; the degree of quaternization preferably is more than 50%, more preferably more than 70%, even more preferably more than 90%, most preferably about 100%.

X is an anion present in sufficient amount to provide electronic neutrality, preferably a water soluble anion selected from the group consisting of chlorine, bromine, iodine, methylsulfate, and mixtures thereof, more preferably chloride. To a great degree, the counter ion X will be derived from the unit which is used to perform the quaternization. For example, if methyl chloride is used as the quaternizing agent, chlorine (chloride ion) will be the counter ion X. Bromine (bromide ion) will be the dominant counter ion in the case where benzyl bromide is the quaternizing reagent.

Preferably from about 10% to about 100%, more preferably from about 20% to about 70%, even more preferably from 30% to about 50%, most preferably from about 35% to about 45% of the R3 groups are an anionic unit, preferably a sulfonate unit, the remaining R3 units being hydrogen.

Most preferred compound is the zwitterionic hexamethylene diamine represented by the following formula:

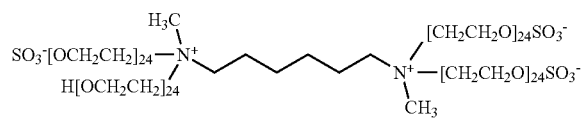

in which approximately 40% of the polyethoxy groups are sulfonated, the remaining polyethoxy groups being hydrogen capped. The degree of quaternization preferably is more than 90%, most preferably about 100%. Preferably the water soluble counter-anion is selected from the group consisting of chlorine, bromine, iodine, methylsulfate, and mixtures thereof, more preferably chloride.

The described zwitterionic polyamines can be made using techniques previously described in the art, and as such those skilled in the art would understand how to produce such compounds. The polyamine is first alkoxylated for example ethoxylated with ethylene oxide, followed by a quaternization step for example by reacting the alkoxylated polyamine with dimethylsulfate, and finally an anionic group substitution step for example by reacting the quaternized alkoxylated polyamine with chlorosulfonic acid.

Filtration

Unexpectedly, it has been discovered that the nanofiltration process can be used successfully to eliminate or reduce the content of certain contaminants or impurities which are normally contained in an initial feed while being able to isolate the active or the surfactant. For example, dioxane can be removed from an initial feed containing an ethoxylated sulfate surfactant and the surfactant isolated for further processing or use.

Because of the simplicity of the process under this invention, this purification method offers certain advantages versus other physical or chemical processes because it does not require introduction of any other element in the solutions to be purified.

As shown in FIG. 1, the process 100 comprises introducing an initial feed 102 composition comprising one or more solvents, a desired active, and one or more contaminants to a feed tank 110. The initial feed composition may be at any workable active concentration, pH, and temperature. The active concentration of the initial feed can be impacted, for example, by viscosity of the initial feed, stability of the initial feed at a given concentration, desired efficiency of throughput, etc. For example, some actives may separate out above or below a particular concentration. Likewise, the viscosity of the initial feed needs to be such that it can be run through the nanofilter with the desired efficiency and avoiding excessive clogging or other processing issues. These and any other relevant factors can be balanced to determine the best selection for concentration of the particular initial feed. The initial feed can have an active concentration of, for example, about 5% to about 45%, about 5% to about 40%, about 5% to about 35%, about 5% to about 30%, about 10% to about 30%, and/or about 15% to about 25%. The initial feed my have a viscosity, for example, of about 1200 cP or less; about 1000 cP or less; about 500 cP or less; about 300 cP or less; from about 25 cP to about 1000 cP; and/or from about 50 cP to about 750 cP.

The pH of the initial feed can impact things like stability of the initial feed, selection of the nanofilter, and the need for a biocide, etc. Selection of these parameters will depend on the active in the initial feed and the needs of the manufacturer. For example, if an active is stable at a higher pH (about 10 or more) and the manufacturer desires to avoid the use of biocides, then that active can be in an initial feed that is at a high pH. The other consideration for pH is that of the nanofilter. The material(s) use in the making of the nanofilter will impact its ability to perform at a given pH. In addition, if utilized at low or high pH, the life span of the nanofilter may be negatively impacted. Thus, the pH of the initial feed can be from about 3 to about 14, about 4 to about 13, about 5 to about 12, about 6 to about 12, about 7 to about 12, about 8 to about 12, about 9 to about 12, about 10 to about 12, about 11 to about 12, or about 10 or more.

The temperature of the initial feed can also impact the ability to or efficiency of filtering of the chemical contaminant. For example, at a lower temperature, an initial feed may be too viscous to filter. Alternatively, at a high temperature, the active or nanofilter may degrade. Temperature may also be selected for convenience. If a particular active is delivered at a higher temperature for transportation reasons, that temperature can be maintained so long as it is compatible with the filtering system. The initial feed can be heated or cooled as desired to reach the target temperature for filtering. The temperature of the initial feed may be, for example, from about 20° C. to about 60° C., from about 25° C. to about 55° C., from about 25° C. to about 50° C., from about 30° C. to about 50° C., and/or from about 40° C. to about 50° C. The specific description below focuses on the use of an ethoxylated surfactant paste and the filtering of 1,4-dioxane, but any suitable active and chemical contaminant can be substituted.

The initial feed may be, for example, an active comprising an ethoxylated surfactant paste that includes at least 5% of AES as the active, preferably about 15 wt % to about 25 wt % of the active; water as the solvent, and 1,4 dioxane as the chemical contaminant. The initial feed is at a temperature of about 40° C. to about 50° C. and a pH of about 11 to about 13. The initial feed is put into the feed tank 110. The feed tank 110 is connected to a filtration column 112 via a pump 114. The pump 114 pulls the initial feed from the feed tank and supplies it to the filtration column 112. The filtration column 112 utilizes a filtration membrane (not shown).

The filtration membrane can be selected based on the properties of the initial feed and the chemical contaminant, like weight average molecular weight, temperature, pH, and viscosity. A disparity in the molecular weight of the chemical contaminant and the active will allow for more efficient filtering. Here, where filtering the initial feed of AES with the parameters noted above, a filter membrane which filters materials with a weight average molecular weight below about 200 Daltons is used. This is selected as dioxane has a weight average molecular weight of about 88 Daltons and the active, AES has a molecular weight of >300 Daltons. Additionally, where the solvent used is water, it has a weight average molecular weight of about 18 Da allowing it to be filtered with the dioxane. Thus, by applying nanofiltration to ethoxylated surfactants, one can reduce the presence of 1-4, dioxane by filtering it out. The filtered water carrying the dioxane can then be replaced with water that is dioxane free.

Selection of the size of the filter is thus based upon the weight average molecular weight of the materials which one is trying to separate. For example, the nanofilter size can be selected so that it filters a weight average molecular weight which includes the molecular weight of the chemical contaminant and excludes the molecular weight of the active. A nanofilter can, for example, filter materials with a weight average molecular weight of about 400 Da or less, about 300 Da or less, about 250 Da or less, about 200 Da or less, about 150 Da or less, or about 100 Da or less. The filtration column may be a single stage or have multiple stages. Adding additional stages can increase the efficiency of the filtering process so that a lower number of passes can be utilized.

Selection of the type of nanofiltration membrane can impact its operating life. For example, if the initial feed is of a high pH, then the nanofiltration membrane can be selected such that it will have sufficient operating life at the high pH. If the nanofiltration membrane's operating life is too short, this can result in a frequent need for changing out the nanofiltration membrane which can be both operationally and fiscally difficult to manage. The nanofilter, for example, can filter about 80% or more of the initial feed before needing to be replaced.

When the initial feed is at a pH of 11 or more, for example 11 to 13, suitable commercial membranes which can be used at this high pH can include, for example, the Synder®-NFS, AMS Technologies B-4022, Koch™ SeIRO® MPS 34, or a combination thereof.

The nanofilter may comprise any material or have any configuration which works in the system. For example, the nanofilter can comprise ceramic, a polymer, or a combination thereof. The membrane can comprise a hollow fiber, a tubular fiber, a spiral wound fiber, or a combination thereof. The nanofilter may be, for example, a spiral and/or contain a spiral element.

The initial feed is passed through the filtration column under pressure. This helps to separate the chemical contaminant from the active. The working pressure of the system may range from about 8 to about 62 kg/cm$^2$. In one example, the pressure is between 10 and 25 kg/cm$^2$. This pressure is a product of the properties of the initial feed, the set-up of the system, selection of the membrane, and number of membranes (i.e. stages).

As the initial feed passes through the filtration column, a filtrate 104 and a retentate 106 are formed. If this is the first pass of the initial feed through the process then they are the initial filtrate and the initial retentate. The filtrate 104 will contain the filtered chemical contaminant and a filtered solvent. It is expected the majority of the solvent will be filtered solvent, but a portion of the solvent may be in the retentate. The retentate will have a lower ratio by weight of the chemical contaminant to the active than the initial feed supply.

The filtered chemical contaminant in the filtrate may then be prepared for disposal. One way to prepare the chemical contaminant for disposal is through the use of additional processing 116. This additional processing can be used to destroy or alter the chemical contaminant. This additional processing can include, for example, advanced oxidation processing, Fenton reaction, photo-Fenton reaction, activated carbon adsorption, catalyst processing, alcohol dehydration reaction, ozone treatment, ultra-violet/$TiO_2$ treatment, incineration, or a combination thereof. Catalysts which can be used to destroy a chemical contaminant can include, for example, calcium oxide, phosphorus pentoxide, chlorine, water and boron oxide with the following amounts of the components as expressed in weight percent: calcium oxide 48.5 to 53.5, phosphorus pentoxide 42.5 to 46.5, chlorine 0.05 to 1.0, boron oxide 0.005 to 3.0, the balance being water. Such catalysts are described in, for example, GB2056421, GB2053871, and/or GB1078117. Catalysts may include calcium phosphate catalysts that may be used in the manufacture of isoprene from isobutene and formaldehyde or by decomposition of 1,3 dioxanes. After the chemical contaminant is put through the additional processing, any recovered solvent (i.e. processed solvent, for example, processed water) may be recycled back into the filtration system or disposed of as desired.

Depending on the efficiency of the process, there could still be more chemical contaminant in the initial or subsequent retentate 106 than desired. If this is the case, the retentate 106 can be fed back to the feed tank 110 and put through the filtering process again until a target level of contaminant is reached. The retentate composition may be diluted back to the original concentration of active by adding solvent, for AES by adding water. The water may or may not be processed filtrate. Additional solvent 108 may be added to the feed tank or in the line to change the ratio of solvent to contaminant. The additional solvent may be added at any time in the process to the initial feed composition 102 or to the retentate 106, including and not limited to, before beginning the process, after placing the feed composition in the feed tank, after the pump, after the nanofilter, or continuously while the process is ongoing including while the process is ongoing and recycling the retentate and after the process has stopped. Once the target level of contaminant is reached, the retentate may be removed from the process. This may be, for example, at least a 90 wt % reduction in the contaminant from the starting level (i.e. before the filtration processing). The acts of filtering and adding solvent may be repeated, for example, until the process yields a concentrated retentate having from about 18% to about 99% by weight of active.

The filtration process may be done in batch as shown below in the example or in a continuous form by having a plurality of columns in series. As described above, additional solvent may be added at any time during the process to increase the ratio of solvent to contaminant. The new composition, including the added contaminant free solvent if any, may then be filtered thereby increasing the ratio of active to contaminant. At that time, additional contaminant free solvent may be added and the process can be repeated again. This may occur until the desired ratio of active to contaminant is reached. Further, as stated above, the initial feed stock may be filtered a plurality of times without adding contaminant free solvent.

Example:

The Nanofilter membrane used was NFS made by Synder Filtration. The filtration was done in a batch process. The composition contained 16.5% alkyl ethoxy sulfate in water and other solvents in water. The initial composition is placed in a feed tank. Next, the composition was circulated through the column containing the 1.8-inch nanofiltration membrane (1.95 $m^2$/membrane). The feed temperature was approximately 38° C. The feed pressure was 14 Kg/$cm^2$.

The filtration process produced an initial filtrate and an initial retentate. The retentate was recirculated back to the feed tank. The filtrate containing water and dioxane contaminant was separately collected.

The flux of water with dioxane achieved was 42 $1/m^2$/hr. The dioxane passage through the membrane was close to 100% as the concentrations analyzed in the feed and filtrate were approximately the same at any given point in time. The surfactant passage was minimal as the filtrate did not produce any foam and foam would be expected to be present in water if the surfactant were at a concentration greater than about 50 ppm. The initial composition may be adjusted to a pH between pH 7 to pH 8.

As shown in the example above, the filtration process produces an initial filtrate and an initial retentate. After filtration, the retentate composition with a higher AES concentration may be recovered. The initial filtrate solution containing the 1,4-dioxane and water may be recovered or may be discarded. The filtrate may be subjected to additional processing to remove the dioxane from the solvent (water), explained further below. The treated filtrate water may then be recycled and reintroduced to the retentate to reduce the viscosity of the retentate through dilution.

Alternatively, the filtration process may repeat a new cycle until the final alkyl ethoxy concentration in the solution recovered under these conditions is approximately 16.5% and is otherwise of similar composition as the initial solution but with at least about 90% lower 1,4-dioxane.

For example, an initial feed of 1,000 L Sodium Alkyl Ethoxy Sulfate at 16.5% w/w, water, and 1,4-Dioxane at 150 ppm may be filtered through one or more cycles until the 1,000 L filtered solution has Sodium Alkyl Ethoxy Sulfate at 16.5% w/w and 1,4-Dioxane at 15 ppm or lower.

Combinations:
- A. A method of removing chemical contaminants from a composition comprising an active, a solvent, and a chemical contaminant, the method comprising:
  - providing an initial feed supply, wherein the initial feed supply comprises the active, the solvent, and the chemical contaminant;
  - providing a nanofilter; and
  - filtering the initial feed supply through the nanofilter to form an initial retentate and an initial filtrate;
  - wherein the initial retentate has a lower ratio of the chemical contaminant to the active than the initial feed supply.
- B. The method of paragraph A, wherein the nanofilter filters chemical contaminants with a weight average molecular weight below 400 Daltons, where the active has a weight average molecular weight above 400 Daltons.
- C. The method of any of paragraphs A-B, wherein the initial filtrate comprises at least a portion of the solvent and the chemical contaminant.

D. The method of any of paragraphs A-C, wherein the method further comprises processing the initial retentate through an additional nanofilter.

E. The method of any of paragraphs A-D, wherein the method further comprises recycling the initial retentate to the feed tank and further processing the initial retentate through the nanofilter.

F. The method of any of paragraphs A-E, wherein the nanofilter is at a pressure between 10 and 25 Kg/cm$^2$.

G. The method of any of paragraphs A-F, wherein the method further comprises adding a solvent to the initial retentate.

H. The method of paragraph G, wherein the method further comprises repeating the steps of filtering and adding a solvent until the process yields a concentrated retentate including 18 wt. % to 99 wt. % active.

I. The method of any of paragraphs A-H, wherein the solvent comprises one or more components having a weight average molecular weight less than 150 Daltons.

J. The method of any of paragraphs A-I, wherein the solvent comprises water, ethanol, propane diol, glycerol, glycerin ethoxylate, or a combination thereof.

K. The method of any of paragraphs A-J, wherein the contaminant comprises 1,4 dioxane, dimethyl dioxane, and combinations thereof L. The method of any of paragraphs A-K, wherein the active comprises an ethoxylated surfactant, a sulfated ethoxylated surfactant, an ethoxylated polymer, a propoxylated surfactant, a sulfated propoxylated surfactant, a propoxylated polymer, or a combination thereof.

M. The method of any of paragraphs A-L, wherein the method further comprises adding a non-ethoxylated surfactant to the initial retentate.

N. The method of any of paragraphs A-M, wherein the nanofilter comprises a spiral element.

O. The method of paragraph N, wherein the spiral element filters contaminants with a weight average molecular weight of about 250 Daltons or less.

P. The method of any of paragraphs A-O, wherein the initial filtrate is further processed to reduce the dioxane to create processed water.

Q. The method of paragraph P, wherein the further processing the dioxane comprises advanced oxidation processing, Fenton reaction, photo-Fenton reaction, activated carbon adsorption, catalyst processing, alcohol dehydration reaction, ozone treatment, ultra-violet/TiO$_2$ treatment, incineration, or a combination thereof.

R. A method of removing chemical contaminants from a composition comprising an active, a solvent, and a chemical contaminant, the method comprising:
providing an initial feed supply, wherein the initial feed supply comprises the active comprising an ethoxylated surfactant, a sulfated ethoxylated surfactant, an ethoxylated polymer, or a combination thereof; the solvent; and the contaminant comprising 1,4 dioxane, dimethyl dioxane, or a combination thereof;
providing a nanofilter;
filtering the initial feed supply through the nanofilter to form an initial retentate and a filtrate;
wherein the initial retentate has a lower ratio of the contaminant to the active than the initial feed supply;
repeating the steps of filtering and adding a solvent until the process yields a concentrated retentate including 18 wt. % to 99 wt. % active.

S. The method of paragraph R, wherein the nanofilter comprises a spiral element.

T. The method of any of paragraphs R-S, wherein the initial feed supply has a pH of about 11 to about 13.

U. Use of a nanofilter to remove at least a portion of 1,4-dioxane from a surfactant composition.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern."

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of removing chemical contaminants from a composition comprising an active, a first solvent, and a chemical contaminant, the method comprising:
providing an initial feed supply, wherein the initial feed supply comprises the active, the first solvent, and the chemical contaminant comprising 1,4 dioxane, dimethyl dioxane, or a combination thereof;
providing a nanofilter; and
filtering the initial feed supply through the nanofilter to form an initial retentate and an initial filtrate;
wherein the initial retentate has a lower ratio of the chemical contaminant to the active than the initial feed supply.

2. The method of claim 1, wherein the nanofilter filters chemical contaminants with a weight average molecular weight below 400 Daltons, where the active has a weight average molecular weight above 400 Daltons.

3. The method of claim 1, wherein the initial filtrate comprises at least a portion of the first solvent and the chemical contaminant.

4. The method of claim 1, wherein the method further comprises processing the initial retentate through an additional nanofilter.

5. The method of claim 1, wherein the method further comprises recycling the initial retentate to the feed tank and further processing the initial retentate through the nanofilter.

6. The method of claim 1, wherein the nanofilter is at a pressure between 10 and 25 Kg/cm$^2$.

7. The method of claim 1, wherein the method further comprises adding a second solvent to the initial retentate.

8. The method of claim 7, wherein the method further comprises repeating the steps of filtering and adding the second solvent until the method yields a concentrated retentate including 18 wt. % to 99 wt. % active.

9. The method of claim 1, wherein the first solvent comprises one or more components having a weight average molecular weight less than 150 Daltons.

10. The method of claim 7, wherein the second solvent comprises water, ethanol, propane diol, glycerol, glycerin ethoxylate, or a combination thereof.

11. The method of claim 1, wherein the active comprises an ethoxylated surfactant, a sulfated ethoxylated surfactant, an ethoxylated polymer, a propoxylated surfactant, a sulfated propoxylated surfactant, a propoxylated polymer, or a combination thereof.

12. The method of claim 1, wherein the method further comprises adding a non-ethoxylated surfactant to the initial retentate.

13. The method of claim 1, wherein the nanofilter comprises a spiral element.

14. The method of claim 13, wherein the spiral element filters contaminants with a weight average molecular weight of about 250 Daltons or less.

15. The method of claim 1, wherein the initial filtrate is further processed to reduce the 1,4 dioxane, dimethyl dioxane, or a combination thereof to create processed water.

16. The method of claim 15, wherein the further processing to reduce the dioxane comprises advanced oxidation processing, Fenton reaction, photo-Fenton reaction, activated carbon adsorption, catalyst processing, alcohol dehydration reaction, ozone treatment, ultra-violet/TiO$_2$ treatment, incineration, or a combination thereof.

17. A method of removing chemical contaminants from a composition comprising an active, a solvent, and a chemical contaminant, the method comprising:
  providing an initial feed supply, wherein the initial feed supply comprises the active comprising an ethoxylated surfactant, a sulfated ethoxylated surfactant, an ethoxylated polymer, a propoxylated surfactant, a propoxylated sulfated surfactant, a propoxylated polymer, or a combination thereof; the solvent; and the contaminant;
  providing a nanofilter;
  filtering the initial feed supply through the nanofilter to form an initial retentate and a filtrate;
  wherein the initial retentate has a lower ratio of the contaminant to the active than the initial feed supply;
  repeating the steps of filtering and adding a solvent until the process yields a concentrated retentate including 18 wt. % to 99 wt. % active.

18. The method of claim 17, wherein the nanofilter comprises a spiral element.

19. The method of claim 18, wherein the initial feed supply has a pH of about 11 to about 13.

20. The method of claim 19, wherein the contaminant comprises 1,4 dioxane, dimethyl dioxane, or a combination thereof.

* * * * *